United States Patent Office 3,305,526
Patented Feb. 21, 1967

3,305,526
PHENOXY PHOSPHITE POLYMERS
Alvin Guttag, Bethesda, Md., assignor to Weston Chemical Corporation, Newark, N.J., a corporation of New Jersey
No Drawing. Filed July 7, 1964, Ser. No. 380,908
14 Claims. (Cl. 260—47)

This application is a continuation-in-part of application Serial No. 256,116, filed February 4, 1963, now abandoned.

The present invention relates to novel phosphites and phosphonates.

It is an object of the present invention to prepare alcoholic hydroxyl containing phosphites which have good temperature stability.

Another object is to prepare phosphites having one or more free hydroxyl groups which can be used to form flame-resistant polyurethanes and polyesters.

A further object is to prepare novel phosphite stabilizers for vinyl chloride resins, polypropylene and other polymers.

A further object is to form novel phosphonates useful for forming flame-resistant polymers, e.g., polyurethanes.

A still further object is to prepare novel lubricating oil additives.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming compounds having one of the following formulae:

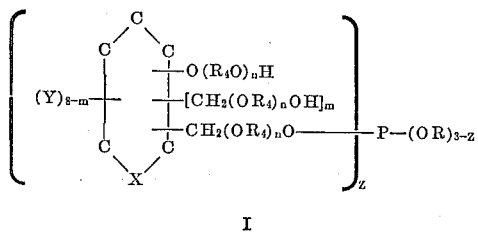

I

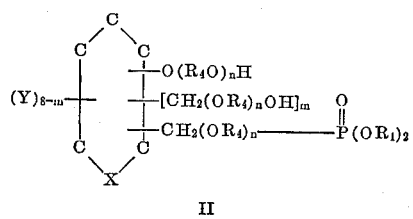

II

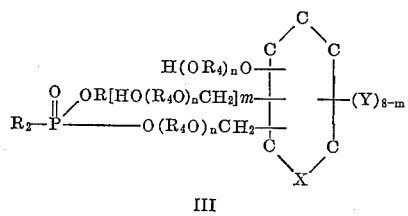

III

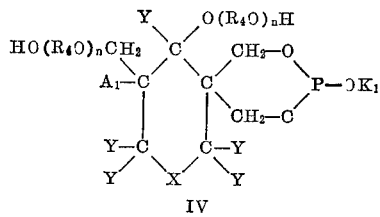

IV

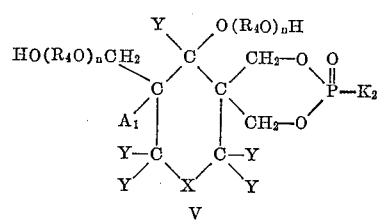

V

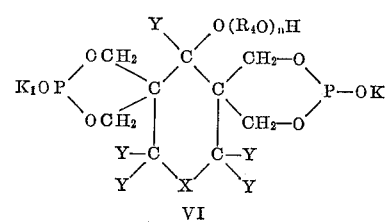

VI

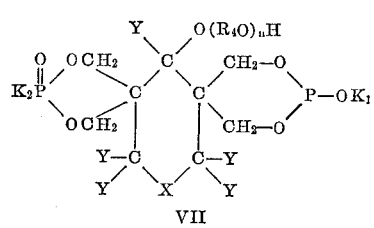

VII

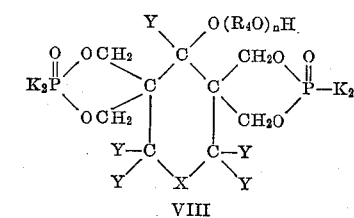

VIII

In the above formulae R is selected from the group consisting of alkyl, aryl (e.g., phenyl or alkylphenyl), aralkyl (e.g., benzyl) or halophenyl; $R_4$ is a lower alkylene radical, e.g., ethylene radical, propylene radical or butylene radical or mixtures of such radicals; $R_1$ is selected from the group consisting of alkyl, aryl (e.g., phenyl or alkylphenyl), aralkyl (e.g., benzyl), halophenyl, or $R_3$ where $R_3$ is

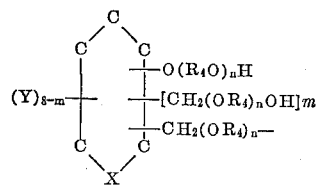

$R_2$ is alkyl, aralkyl, hydroxyalkyl, hydroxy-alkoxyalkyl, hydroxypolyalkoxyalkyl or $R_3$; Y is hydrogen or lower alkyl containing 1 to 6 carbon atoms; $A_1$ is hydrogen, lower alkyl of 1 to 6 carbon atoms or $$HO(R_4O)_nCH_2—$$

$K_1$ is alkyl, aryl (e.g., phenyl or alkylphenyl), aralkyl (e.g., benzyl) or $H(OR_4)_f—$; $K_2$ is alkyl, aralkyl or $H(OR_4)_f—$; X is oxygen or $—CH_2—$, preferably X is oxygen; Z is an integer from 1 to 3 inclusive; $m$ is an integer from 1 to 3 inclusive; $n$ is selected from the group consisting of zero and an integer of 1 or more, e.g., 1 to 100; $f$ is an integer of at least 1, e.g., 1 to 100.

The compounds of the present invention are all useful for imparting flame resistance to polymers such as polyurethanes (e.g., a polyurethane from toluene diisocyanate and polypropylene glycol 2025) or polyesters (e.g., polyethylene terephthalate or styrene modified ethylene glycol maleate phthalate) or to impart flame resistance to cellulose and cellulose esters, e.g., cellulose acetate, or cellulose ethers. The phosphites of the present invention are useful as antioxidants and stabilizers for polypropylene, polyvinyl chloride and other vinyl halide resins as well as being stabilizers for polyurethanes and epoxy resins.

Both the phosphonates and the phosphites of the present invention contain a reactive hydroxyl group which is useful in making polyurethanes and polyesters. If only one hydroxyl group is present the phosphite or phosphonate serves as a chain stopper. If a plurality of hydroxyl groups are present the phospite or phosphonate of the present invention can serve as the sole polyhydroxyl compound for reaction with a polyisocyanate, e.g., toluene diisocyanate and PAPI (polymerized phenylmethyleneisocyanate) to form a flame-resistant polyurethane or there can also be incorporated 1 to 98% of another polyol, e.g., polypropylene glycol 2025 or glycerine-propylene oxide adduct molecular weight 3000.

The phosphites of the present invention are prepared by reacting a phosphite having the formula $(R_5O)_3P$ with a substituted pyranol or substituted cyclohexanol. The reaction is normally carried out in the presence of 0.1–10% of a catalyst based on the weight of the $(R_5O)_3P$ compound. As catalysts there can be used diaryl phosphites or dialkyl phosphites, e.g., diphenyl phosphite, di-p-cresyl phosphite, diethyl phosphite and didecyl phosphite, or there can be used alkaline catalysts, e.g., alcoholates and phenolates such as sodium methylate, sodium decylate, sodium phenolate or potassium cresylate.

In the formula $(R_5O)_3P$ the radical $R_5$ is alkyl, aryl, haloaryl or aralkyl. Examples of starting phosphites having the formula $(R_5O)_3P$ are triphenyl phosphite, tri p-cresyl phosphite, tribenzyl phosphite, phenyl didecyl phosphite, tris decyl phosphite, tri o-chlorophenyl phosphite, trimethyl phosphite and trioctadecyl phosphite.

The substituted tetrahydropyranols and substituted cyclohexanols employed as starting materials for the most part are old compounds. Those which are new are analogous to the old ones and can be prepared in like manner. Typical examples of suitable starting substituted tetrahydropyranols and substituted cyclohexanols are found in Barnes Patent 3,022,256 and Wittcoff Patent 2,462,031. To prepare the oxyalkylated compounds of the present invention there can be employed conventional oxyalkylation techniques such as shown in Barnes Patent 3,022,256 or De Groote Patent 2,499,365.

Th preferred starting material is anhydroenneaheptitol available under the trade name AEH and which is also called 3,3,5,5-tetrakis (hydroxymethyl)-4-hydroxy-tetrahydropyran.

Other examples of substituted tetrahydropyranols and substituted cyclohexanols which can be employed as starting materials are 3,3,5-tris (hydroxymethyl)-5-methyl-4-hydroxy tetrahydropyran; 3,5-bis (hydroxymethyl)-3,5-dimethyl-4-hydroxytetrahydropyran; 2,2,6,6-tetrakis (hydroxymethyl) cyclohexanol; 3,3,5-tris (hydroxymethyl)-5-n-hexyl-4-hydroxytetrahydropyran; adduct of 10 mols of propylene oxide with 1 mol of 3,3,5,5-tetrakis (hydroxymethyl)-4-hydroxy-tetrahydropyran (hydroxy No. about 357) adduct of 8 mols of propylene oxide with 1 mol of 3,3,5-tris (hydroxymethyl)-5-methyl-4-hydroxy-tetrahydropyran (hydroxyl No. about 347); adduct of 14.5 mols of propylene oxide with 1 mol of 3,5-(hydroxymethyl)-3,5-dimethyl-4-hydroxy-tetrahydropyran (hydroxyl No. about 168); adduct of 5 mols of propylene oxide with 1 mol of 3,3,5,5-tetrakis (hydroxymethyl)-4-hydroxy-tetrahydropyran; adduct of 4 mols of propylene oxide with 1 mol of AEH; adduct of 10 mols of ethylene oxide with 1 mol of AEH; adduct of 10 mols of butylene oxide with 1 mol of AEH. Adduct of 20 mols of ethylene oxide with 1 mol of 3,3,5-tris (hydroxymethyl)-5-methyl-4-hydroxy-tetrahydropyran.

The phosphites within Formula I are prepared by reacting at least two mols of a substituted tetrahydropyranol or substituted cyclohexanol of the type indicated with 1 mol of a phosphite having the formula $(R_5O)_3P$. When Z in Formula I is 2 then 2 mols of the substituted tetrahydropyranol or cyclohexanol are employed. When Z is 3 then at least 3 mols of the substituted tetrahydropyranol or cyclohexanol are employed. Preferably excess substituted tetrahydropyranol or cyclohexanol are used, e.g., 4,5, 10 or 15 mols per mol of starting phosphite to cut down on possible side reactions. The excess substituted tetrahydropyranol or cyclohexanol when such excess is employed can be removed if desired from the phosphite product by the use of solvents. For many uses, however, there is no need to remove the excess. Thus, if the phosphite product is to be used to make foamed polyurethanes the excess substituted tetrahydropyranol or cyclohexanol can be left in the product since the substituted tetrahydropyranol or cyclohexanol as well as the phosphite product of Formula I will react with the polyisocyanate, e.g., toluene diisocyanate and foaming agent, e.g., water, to give a solid foamed polyurethane. The presence of the phosphite of Formula I insures that the polyurethane will have good flame and fire resistance. Similarly, if the phosphite of Formula I is to be used to form a polyester any excess substituted tetrahydropyranol or cyclohexanol can be left in the phosphite of Formula I.

The compounds of Formula I wherein Z is 1 and $m$ is 1 and the $-CH_2(OR_4)_nOH$ group is attached to a different carbon atoms then the $-CH_2(OR_4)_nO$ group can be formed by reacting 1 mol of the substituted tetrahydropyranol or cyclohexanol with 1 mol of the phosphite $(R_5O)_3P$.

The compounds within Formula IV can be prepared by reacting 1 mol of a substituted tetrahydropyranol or cyclohexanol having at least one carbon atom having attached thereto two hydroxymethyl groups with 1 mol of a phosphite having the formula $(R_5O)_3P$. In the event that $K_1$ is $H(OR_4)_f-$ then the initial product must be further reacted with 1 mol of the appropriate dihydric alcohol, e.g., ethylene glycol, propylene glycol, diethylene glycol or dipropylene glycol utilizing an alkaline catalyst or dihydrocarbon phosphite catalyst as indicated above and distilling, preferably under vacuum to remove the phenol or monohydric alcohol formed.

The compounds within Formula VI are formed by reacting 1 mol of a substituted tetrahydropyranol or cyclohexanol having two carbon atoms to each of which are attached two hydroxymethyl groups with 2 mols of a phosphite having the formula $(R_5O)_3P$. In the event that at least one K is $H(OR_4)_f-$ then the initial product is reacted with 1 or more mols, e.g., 2 mols of the appropriate dihydric alcohol, e.g., ethylene glycol, propylene glycol or dipropylene glycol in the manner set forth previously.

The phosphonates of the present invention are prepared by Arbuzov rearrangement of the phosphites utilizing alkyl halides, alkenyl halide or aralkyl halides or hydroxyalkyl halides having the Formula $R_6X$ where $R_6$ is alkyl, aralkyl or hydroxyalkyl and X is a halogen or using alkali metal or alkaline earth metal halides, e.g., sodium iodide, sodium bromide, lithium iodide, calcium iodide, potassium iodide.

Thus the phosphites of the present invention can be isomerized to the corresponding phosphonates by heating, e.g., at a temperature of 130–225° C. with a catalytic amount, e.g., 1–10 mol percent of sodium iodide, sodium bromide, potassium iodide, butyl bromide, amyl bromide, amyl chloride, amyl iodide, ethylene bromohydrin, propylene iodohydrin, allyl bromide, decyl iodide, octadecyl iodide, benzyl bromide, benzyl iodide, methyl iodide.

If at least 1 mol of the compound $R_6X$ is employed per mol of the phosphite then the $R_6$ group is attached directly to the phosphorus atom of the product rather than the R or $K_1$ group of the starting phosphite of Formulae I, IV, VI.

The phosphonates of Formulae II and III are formed by Arbuzov rearrangement of the corresponding phosphites of Formula I. The phosphonates of Formula V are formed by Arbuzov rearrangement of the appropriate phosphites of Formula IV. The compounds of Formulae VII are formed initially in the Arbuzov rearrangement of the corresponding phosphites of Formulae VI. If the Arbuzov rearrangement is continued by further heating then the compounds of Formulae VIII are formed.

Illustrative compounds within the present invention are tris [3,3,5,5-tetrakis (hydroxymethyl)-4-hydroxy-tetrahydropyran phosphite [also called tris AEH phosphite] and having the formula

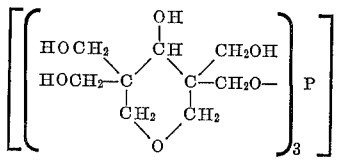

tris [3,3,5-tris (hydroxymethyl)-5-methyl-4 hydroxytetrahydropyran] phosphite;
tris [3,5-bis (hydroxymethyl)-3,5-dimethyl-4-hydroxytetrahydropyran] phosphite;
tris [2,2,6,6-tetrakis (hydroxymethyl) cyclohexanol] phosphite;
bis AEH phenyl phosphite;
bis AEH methyl phosphite;
bis AEH decyl phosphite;
bis AEH allyl phospite;
bis AEH hydroxypropyl phosphite;
bis AEH octadecyl phosphite;
bis AEH p-cresyl phosphite;
bis AEH benzyl phosphite;
3,5-bis (hydroxymethyl)-3,5-dimethyl-4-hydroxy tetrahydropyran diphenyl phosphite;
3,5-bis (hydroxymethyl)-3,5-dimethyl-4-hydroxytetrahydropyran dipropyl phosphite;
bis [2,2,6,6-tetrakis (hydroxymethyl) cyclohexanol] decyl phosphite;
tris AEH phosphonate

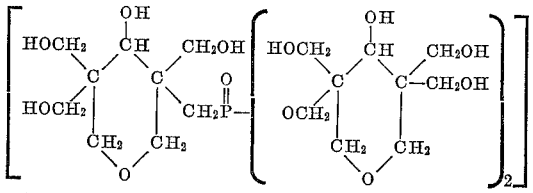

bis AEH methane phosphonate;
bis AEH decane phosphonate;
bis AEH octadecane phosphonate;
bis AEH propene phosponate;
bis AEH phenylmethanephosphonate;
bis AEH 2-hydroxypropanephosphonate;
bis AEH 2-hydroxybutanephosphonate;
bis AEH hydroxyethanephosphonate;
phenyl bis AEH phosphonate;
diphenyl 3,5-bis (hydroxymethyl)-3,5-dimethyl-4-hydroxy-tetrahydropyranphosphonate;
tris (AEH-10 mols propylene oxide adduct) phosphite;
tris (AEH-5 mols ethylene oxide adduct) phosphite;
tris (AEH-15 mols butylene oxide adduct) phosphite;
tris (AEH-10 mols propylene oxide adduct) phosphonate;
tris (AEH-5 mols ethylene oxide adduct) phosphonate;
bis (AEH-15 mols propylene oxide adduct) butanephosphonate;
tris [2,2,6,6-tetrakis (hydroxymethyl (cyclohexanol] phosphonate;
2-phenoxy-1,3,8-trioxa-2-phospha-10, 10-bis (hydroxymethyl)-11-hydroxy (5,5) spiroundecane;
2-methoxy-1,3,8-trioxa-2-phospha-10, 10-bis (hydroxymethyl)-11-hydroxy (5,5) spiroundecane

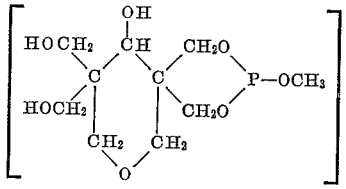

2-methanephosphono 1,3,8-trioxa-10, 10-bis (hydroxymethyl)-11-hydroxy (5,5) spiroundecane

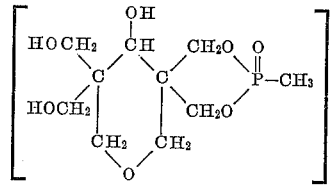

2-decoxy-1,3,8-trioxa-2-phospha-10, 10-bis (hydroxymethyl)-11-hydroxy (5,5) spiroundecane;
2-decane phosphono 1,3,8-trioxa-10, 10-bis (hydroxymethyl)-11-hydroxy (5,5) spiroundecane;
2-octadecoxy-1,3,8-trioxa-2-phospha-10, 10-bis (hydroxymethyl)-11-hydroxy (5,5) spiroundecane;
2-octadecane phosphono-1,3,8-trioxa-10, 10-bis (hydroxymethyl)-11-hydroxy (5,5) spiroundecane;
2-decoxy-1,3,8-trioxa-2-phospha-10, 10-bis (hydroxymethyl)-11-hydroxypropoxy (5,5)spiroundecane;
2-hydroxypropoxy-1,3,8-trioxa-2-phospha-10, 10-bis (hydroxymethyl)-11-hydroxy (5,5) spiroundecane;
2-($2^1$-hydroxy) propane-phosphono-1,3,8-trioxa 10, 10-bis (hydroxymethyl)-11-hydroxy (5,5) spiroundecane;
2-phenylmethane phosphono-1,3,8-trioxa-10, 10-bis (hydroxymethyl)-11-hydroxy (5,5) spiroundecane;
2-propenephosphono-1,3,8-trioxa-10, 10-bis (hydroxymethyl)-11-hydroxy (5,5) spiroundecane;
2-phenoxy-1,3,8-trioxa-2-phospha-10-methyl-10-hydroxymethyl-11-hydroxy (5,5) spiroundecane;
2-decanephosphono-1,3,8-trioxa-10-methyl-10-hydroxymethyl-11-hydroxy (5,5) spiroundecane;
2-phenoxy-1,3-dioxa-2-phospha-10, 10-bis (hydroxymethyl)-11-hydroxy (5,5) spiroundecane [which can also be called 2-phenoxy-1,3-dioxa-2-phospha-7-hydroxy - 8,8-bis (hydroxymethyl) (5,5) spiroundecane];
2-hydroxyethanephosphono-1,3-dioxa-10, 10-bis (hydroxymethyl)-11-hydroxy (5,5) spiroundecane;
2,14-diphenoxy-1,3,8,13,15-pentaoxa-2,14-diphospha-11-hydroxy [5,5,10,10] dispiro hexadecane

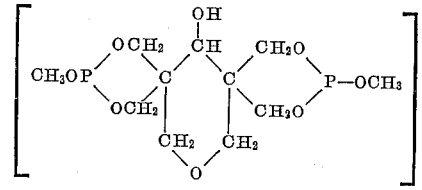

2,14-di(methanephosphono)-1,3,8,13,15-pentaoxa-11-hydroxy [5,5,10,10] dispiro hexadecane

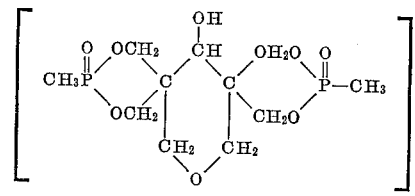

2,14-dioctadecoxy-1,3,8,13,15-pentaoxa-2,14-diphospha-11-hydroxy [5,5,10,10] dispiro hexadecane;
2,14-di(octadecanephosphono)-1,3,8,13,15-pentaoxa-11-hydroxy [5,5,10,10] dispiro hexadecane;
2,14-dioleyloxy-1,3,8,13,15-pentaoxa-2,14-diphospha-11-hydroxy [5,5,10,10] dispiro hexadecane;
2,14-(di$\Delta^{9\prime}$-octadecene-phosphono)-1,3,8,13,15-pentaoxa-11-hydroxy [5,5,10,10] dispiro hexadecane;
2,14-di (2'-hydroxypropoxy)-1,3,8,13,15-pentaoxa-2,14-diphospha-11-hydroxy [5,5,10,10] dispiro hexadecane;
2,14-di (2'-hydroxypropanephosphono)-1,3,8,13,15-pentaoxa-11-hydroxy [5,5,10,10] dispiro hexadecane;
2,14-didecoxy-1,3,13,15-tetraoxa-2,14-diphospha-11-hydroxy [5,5,10,10] dispiro hexadecane;
2,14-di(decanephosphono)-1,3,13,15-tetraoxa-11-hydroxy [5,5,10,10] dispiro hexadecane;
2-butanephosphono-14-butoxy-1,3,8,13,15-pentaoxa-14-phospha-11-hydroxy [5,5,10,10] dispiro hexadecane;
2,14-dibenzyloxy-1,3,8,13,15-pentaoxa-2,14-diphospha-11-hydroxy [5,5,10,10] dispiro hexadecane;
2,4-di (phenylmethanephosphono)-1,3,8,13,15-pentaoxa-oxa-11-hydroxy [5,5,10,10] dispiro hexadecane;

the phosphite made from 1 mol of the AEH-5 mols of propylene oxide adduct and 1 mol of trimethyl phosphite and also the phosphonate made by isomerizing the phosphite; the phosphite made from 1 mol of the AEH-15 mols of ethylene oxide adduct and 1 mol of tris benzyl phosphite and also the phosphonate made by isomerizing the phosphite.

Unless otherwise indicated, all parts and percentages are by weight.

3,3,5,5-tetrakis (hydroxymethyl)-4-hydroxytetrahydropyran is commercially available under the trade name AEH in the form of a 70% aqueous solution. Before reacting the AEH with a tris hydrocarbon phosphite preferably substantially all of the water is removed by distillation to leave the AEH as a viscous syrup. Alternatively the water can be azeotroped off with 1,4-dioxane as a solvent and the AEH can be left in the dioxane solution.

Example 1

3 mols of AEH as a substantially anhydrous syrup, 1 mol of triphenyl phosphite and 3 grams of diphenyl phosphite were heated in a vacuum of about 15 mm. and the phenol formed removed by distillation. The viscous residue in the pot was tris AEH phosphite.

Example 2

1 mol of tris AEH phosphite was heated at 200° C. with 5 mol percent of n-amyl iodide for 7 hours to form tris AEH phosphonate by the Arbuzov rearrangement.

Example 3

5 mols of AEH syrup were heated with 1 mol of tris decyl phosphite and 2 grams of bis decyl phosphite in a vacuum of about 15 mm. and the decyl alcohol formed removed by distillation. The residue in the pot was a mixture of tris AEH phosphite and AEH. This mixture was suitable as such for reaction with toluene disocyanate and water to give a foamed polyurethane.

Example 4

The mixture of tris AEH phosphite and AEH formed in Example 3 was heated with 4 mol percent of butyl bromide based on the tris AEH phosphite. After heating for 8 hours at 200° C. there was formed tris AEH phosphonate admixed with free AEH. This product was suitable for use as such with toluene disocyanate to form a polyurethane.

Example 5

2 mols of AEH were heated with 1 mol of trimethyl phosphite and 2 grams of bis decyl phosphite. The methyl alcohol formed was removed by distillation to form bis AEH methyl phosphite as the residue.

Example 6

Bis AEH methyl phosphite was heated at 200° C. with 3 mol percent of butyl iodide for 7 hours to form bis AEH methanephosphonate.

Example 7

1 mol of bis AEH methyl phosphite was heated at 200° C. with an equimolar amount of propylene bromohydrin for 8 hours to bis AEH 2-hydroxypropanephosphonate.

Example 8

6 mols of AEH-propylene oxide adduct (having 10 mols of propylene oxide per mol of AEH) was heated with 1 mol of triphenyl phosphite and 3 grams of diphenyl phosphite while removing the phenol formed in a vacuum. The product was tris AEH-propylene oxide adduct phosphite admixed with the excess AEH-propylene oxide adduct.

The product of Example 8 was rearranged to the corresponding tris AEH-propylene oxide adduct phosphonate by heating to 200° C. with 4 mol percent of amyl iodide based on the tris AEH-propylene oxide adduct phosphite.

Example 9

4 mols of 3,3,5-tris (hydroxymethyl)-5-methyl-4-hydroxy tetrahydropyran in syrup form were heated with 1 mol of triphenyl phosphite and 3 grams of diphenyl phosphite and the phenol formed removed in the manner set forth in Example 1. The residue was tris [3,3,5-tris (hydroxymethyl)-5-methyl-4-hydroxy tetrahydropyran] phosphite.

The corresponding phosphonate is formed by heating the product of Example 9 with 5 mol percent of amyl bromide based on the phosphite.

Example 10

3 mols of 3,5-bis(hydroxymethyl)-3,5-dimethyl-4-hydroxy tetrahydropyran were heated with 1 mol of triphenyl phosphite and 3 grams of diphenyl phosphite using the procedure of Example 1 to produce tris [3,5-bis(hydroxymethyl)-3,5-dimethyl-4-hydroxy tetrahydropyran] phosphite.

The corresponding phosphonate is formed by heating the product of Example 10 with 6 mol percent of butyl bromide.

Example 11

1 mol of AEH syrup was heated with 1 mol of triphenyl phosphite in the presence of 3 grams of diphenyl phosphite. The phenol formed was removed in a vacuum at 15 mm. The product was 2-phenoxy-1,3,8-trioxa-2-phospha-10,10-bis (hydroxymethyl)-11-hydroxy (5,5) spiro undecane.

Example 12

1 mol of the product of Example 11 was heated with 1 mol of dipropylene glycol and 3 grams of diphenyl phosphite. The phenol formed was removed in vacuum. The product was 2-hydroxypropoxy-propoxy-1,3,8-trioxa-2-phospha-10,10-bis (hydroxymethyl)-11-hydroxy (5,5) spiro undecane.

The product of Example 12 when heated with 5 mol percent of amyl iodide produced 2-hydroxypropoxy-propanephosphono-1,3,8-trioxa-10,10-bis (hydroxymethyl)-11-hydroxy (5,5) spiro undecane.

Example 13

1 mol of AEH syrup was heated with 1 mol of tris decyl phosphite in the presence of 3 grams of bis decyl phosphite. The decyl alcohol was removed in vacuum. The product was 2-decoxy-1,3,8-trioxa-2-phospha-10,10-bis (hydroxymethyl)-11-hydroxy (5,5) spiro undecane.

Example 14

1 mol of the product of Example 13 was heated to 200° C. with 5 mol percent of decyl iodide to produce 2 - decanephosphono - 1,3,8 - trioxa-10,10 - bis (hydroxymethyl)-11-hydroxy (5,5) spiro undecane.

Example 15

1 mol of 3,3,5,5-tetrakis-(hydroxymethyl)-4-pyranol was heated with 1 mol of triallyl phosphite and 3 grams of diallylphosphite to produce 2-allyloxy-1,3-dioxa-2-phospha-10,10-bis (hydroxymethyl)-11-hydroxy (5,5) spiro undecane. By heating with 5% of allyl iodide this product was rearranged to 2-propenephosphono-1,3-dioxa-10,10-bis (hydroxymethyl)-11-hydroxy (5,5) spiro undecane.

Example 16

1 mol of AEH syrup was heated with 2 mols of triphenyl phosphite in the presence of 3 grams of diphenyl phosphite. The phenol formed was removed in a vacuum at 15 mm. to produce 2,14-diphenoxy-1,3,8,13,15-pentaoxa-2,14-diphospha-11-hydroxy [5,5,10,10] dispiro hexadecane.

Example 17

1 mol of AEH syrup was heated with 2 mols of tris octyl phosphite in the presence of 3 grams of dioctyl phosphite. The octyl alcohol formed was removed by vacuum distillation. The product was 2,14-dioctoxy-1,3,8,13,15 - pentaoxa - 2,14 - diphospha - 11 - hydroxy [5,5,10,10] dispiro hexadecane.

Example 18

1 mol of the product of Example 17 was heated at 200° C. with 5 mol percent of octyl iodide. At first there was formed some 2-octanephosphono-14-butoxy-1,3,8,13,15 - pentaoxa - 14 - phospha - 11 - hydroxy [5,5-10,10] despiro hexadecane. Upon further heating at 200° C. this was converted to 2,14-di(octanephosphono)-1,3,8,13,15-pentaoxa-11-hydroxy [5,5,10,10] dispiro hexadecane.

Example 19

1 mol of the product of Example 16 was heated with 2 mols of propylene glycol in the presence of 3 grams of diphenyl phosphite and the phenol formed removed by distillation in a vacuum. The product was 2,14-bis (2' - hydroxypropoxy) - 1,3,8,13,15 - pentaoxa - 2,14-diphospha-11-hydroxy [5,5,10,10] dispiro hexadecane. By prolonged heating at 210° C. with 3 mol percent of propylene iodohydrin this product was converted to the corresponding diphosphonate.

Example 20

1 mol of AEH-ethylene oxide adduct (having 5 ethylene oxide units per mol of AEH) was heated with 2 mols of tris decyl phosphite and 3 grams of bis decyl phosphite to produce the dispiro diphosphite. By heating one mol of the dispiro phosphite with 5 mol percent of decyl bromide the corresponding dispiro diphosphonate was produced.

Phosphites and phosphonates can also be prepared by reacting a tris hydrocarbon phosphite with a phenoxy material of the formula

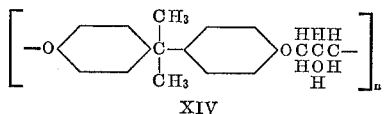

XIV where $n$ is an integer of at least 2 and preferably of 10 or more, e.g. 200. A commercial phenoxy material of the above formula has a value for $n$ of about 100 and a molecular weight of about 30,000.

As shown in the De Melio Patent 3,225,118, issued December 21, 1965, phenoxy polymers can be prepared by admixing a dihydric polynuclear phenol, from 0.985 to about 1.015 moles of an epihalohydrin together with from about 0.6 to about 1.5 moles per mole of dihydric polynuclear phenol, of an alkali metal hydroxide such as sodium hydroxide, potassium hydroxide generally in an aqueous medium at a temperature of about 10° C. to about 50° C. until at least about 60 mole percent of the epihalohydrin has been consumed adjusting, if necessary, the amount of alkali metal hydroxide in the reaction mixture so that the final concentration of alkali in the aqueous phase of the reacted mixture is at least about 0.1 molal and heating the reaction mixture at a temperature of from about 60° C. to boiling or reflux until the polyhydroxyether produced has a sufficient reduced viscosity. Such method of preparing the starting phenoxy polymer is not part of the present invention but, as stated, is old in the art.

The reaction is carried out in the presence of a catalyst such as a dihydrocarbon phosphite or alkaline catalyst of the types set forth previously. The resulting polymeric phosphite products are useful to impart flame and fire resistance to polyurethanes, polyesters or epoxy resins formed by utilizing them either as one of the reactants or as an additive to the already formed polyurethane, epoxy resin or polyester.

Example A 1 mol of phenoxy resin of Formula XIV where $n$ is 100, was dissolved in xylene and heated with 10 mols of triphenyl phosphite in the presence of 30 grams of diphenyl phosphite catalyst. The xylene solvent and the phenol formed were removed by distillation. The product was a phenoxy resin phosphite having 70 free hydroxyl groups in the molecule. It can be reacted with toluene diisocyanate to give a flame resistant polyurethane. By adding water to the toluene diisocyanate the product is a flame resistant foamed polyurethane.

The phenoxy resin can have a molecular weight of 10,000 or more, e.g., it can have a molecular weight of 20,000, 50,000 or even 100,000. The phosphites and phosphonates of the phenoxy resin are useful in reacting with polyisocyanates to form insulating compositions which are flame and fire resistant as clothing liners, etc.

In Example A there was employed triphenyl phosphite. There can also be employed tri p-cresyl phosphite, tri o-cresyl phosphite, tri m-cresyl phosphite, trixylenyl phosphite, tris decyl phosphite, trioctadecyl phosphite, trimethyl phosphite, tri 2-ethylhexyl phosphite, triisodecyl phosphite or diphenyldecyl phosphite. Normally, an excess of the triphenyl phosphite or the like is employed on a molar basis, although it is not necessary to react all of the hydroxyl groups of the phenoxy materials. There can be employed 1 to 200 mols of phosphite per mol of phenoxy material. If sufficient phosphite is employed to react with all the free hydroxyls of the phenoxy material, then the resultant product can be employed as a flame retardant stabilizer for polyethylene or polypropylene or ethylene-propylene copolymers, e.g., utilizing 0.1 to 10% of the phenoxy material. As indicated if free hydroxyl groups are available in the product it can be employed in forming polyurethanes.

The reaction between the phenoxy material and the phosphite is usually carried out with the aid of heat and the phenol or alcohol formed is removed by distillation.

Phosphonates can be prepared from the phenoxy resin phosphites by addition of a small amount of an alkyl halide, e.g., amyl iodide, and heating the mixture to undergo the Arbuzov rearrangement. The phosphonates can be used as flame-proofing agents.

In place of the phenoxy resin of Example A there can be used other linear polymers having the formula [O—R—OCH$_2$CHOHCH$_2$]$_n$ where $n$ is at least two and R is the residue of a dihydric phenol. Illustrative of such dihydric phenols are di(hydroxyaryl) alkylidenes such as bisphenol A [also called di(4-hydroxyphenyl) dimethyl methane], di(4-hydroxy-3-methylphenyl) dimethyl methane, di(4-hydroxy-3-methylphenyl) methyl methane, di(p-hydroxyphenyl) methyl methane, di(p-hydroxyphenyl) methyl ethyl methane, di(4-hydroxyphenyl) methane, di(4-hydroxy-3-methylphenyl)

phenyl methane, di(4-hydroxyphenyl) sulfone, di(4-hydroxyphenyl) sulfide, di(4-hydroxyphenyl) sulfoxide, di(3-phenoxyphenyl) dimethyl methane, tetrachloro bisphenol A, tetrabromo bisphenol A, 4,4'-methylene bis-(2-methyl-6t-butylphenol), di(4-hydroxyphenyl) ether, resorcinol, hydroquinone, p,p'-dihydroxy-diphenyl.

There can even be employed the linear epichlorhydrin adducts of hydrogenated derivatives dihydric phenols, e.g. 4,4'-isopropylidene dicyclohexanol (also called bis(4-hydroxycyclohexyl) dimethyl methane or hydrogenated bisphenol A), 1,4-cyclohexane dimethanol, di-(p-hydroxycyclohexyl) methyl ethyl methane, di(4-hydroxycyclohexyl) methane, and di(3-hydroxycyclohexyl) dimethyl methane.

While $n$ in the formula is at least 2 it is desirably high enough that the staring polymer has a molecular weight of at least 5000 and preferably at least 10,000.

Obviously the polymer can be a copolymer in which two or more different R units can be in the polymer chain.

What is claimed is:

1. The reaction product of a trihydrocarbon phosphite and a phenoxy polymer having the formula

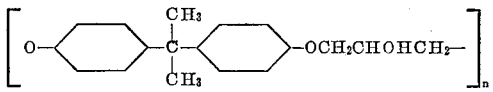

where $n$ is a least 10 and the reactants are employed in the mol ratio of 1 to 200 moles of phosphite per mole of phenoxy polymer with the aid of heat, and the monomeric hydroxy hydrocarbon formed is removed by distillation.

2. A compound according to claim 1 where $n$ is at least 10 and the hydrocarbon group is selected from the group consisting of alkyl and monocyclic carbocyclic aryl.

3. A compound according to claim 2 wherein the phosphite employed is triphenyl phosphite.

4. A product according to claim 1 wherein the phenoxy polymer has a molecular weight of at least 10,000.

5. A compound according to claim 4 wherein the trihydrocarbon phosphite is triphenyl phosphite.

6. A reaction product according to claim 1 wherein the phenoxy polymer has a molecular weight of about 30,000.

7. A process of preparing a phosphite comprising reacting a phenoxy polymer having the formula

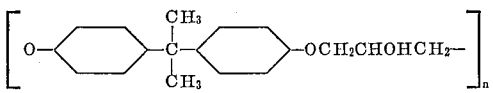

where $n$ is at least 10, with a trihydrocarbon phosphite and the reactants are employed in the mole ratio of 1 to 200 moles of phosphite per mole of phenoxy polymer with the aid of heat, and the monomeric hydroxy hydrocarbon formed is removed by distillation.

8. A process according to claim 7 wherein the phenoxy polymer has a molecular weight of at least 10,000 and the hydrocarbon groups of the phosphite are selected from the group consisting of (a) monocyclic carbocyclic aryl and (b) alkyl and wherein the reaction is carried out in the presence of a catalyst selected from the group consisting of dihydrocarbon phosphites and alkaline catalysts.

9. A process according to claim 8 wherein said member of the group is triphenyl phosphite.

10. The reaction product of a trihydrocarbon phosphite and a linear polymer of the formula $$\text{\textlbrackdbl}O\text{---}R\text{---}OCH_2CHOHCH_2\text{\textrbrackdbl}_n$$

where $n$ is at least 10 and R is the residue of a member of the group consisting of a dihydric phenol and a hydrogenated dihydric phenol, the hydroxyl groups of said member being separated by at least one other carbon atom, and wherein the reactants are employed in the mole ratio of 1 to 200 moles of phosphite per mole of polymer with the aid of heat, and the monomeric hydroxyl hydrocarbon formed is removed by distillation.

11. A reaction product according to claim 10 where R is the residue of a dihydric phenol.

12. A reaction product according to claim 11 wherein the linear polymer has a molecular weight of at least 5000.

13. A reaction product according to claim 12 wherein R is the residue of a di(hydroxyaryl) alkylidene.

14. A reaction product according to claim 13 wherein the linear polymer has a molecular weight of about 30,000.

References Cited by the Examiner
UNITED STATES PATENTS

| | | | |
|---|---|---|---|
| 3,074,966 | 1/1963 | Barnes | 260—2.5 |
| 3,142,651 | 7/1964 | Friedman | 260—2.5 |

WILLIAM H. SHORT, *Primary Examiner.*

SAMUEL H. BLECH, *Examiner.*

M. GOLDSTEIN, J. C. MARTIN, *Assistant Examiners.*